Dec. 22, 1931.    H. W. THOMPSON    1,837,925

WRINGER ROLL

Filed April 12, 1928

Horace W. Thompson
INVENTOR.

BY
ATTORNEYS.

Patented Dec. 22, 1931

1,837,925

UNITED STATES PATENT OFFICE

HORACE W. THOMPSON, OF CLEVELAND HEIGHTS, OHIO, ASSIGNOR TO LOVELL MANUFACTURING COMPANY, OF ERIE, PENNSYLVANIA, A CORPORATION OF PENNSYLVANIA

WRINGER ROLL

Application filed April 12, 1928. Serial No. 269,367.

This invention is designed to improve wringer rolls. Ordinarily wringer rolls are made with a central shaft and a wall of rubber secured to the shaft, the wall of rubber as it extends from end to end of the roll being of a like quality in different portions of the length. According to the present invention of the central part of the roll is made of a different quality than the ends being formed preferably of a higher grade and more resilient material. Features and details of the invention will appear from the specification and claims.

A preferred embodiment of the invention is illustrated in the accompanying drawings as follows:—

Figure 1:
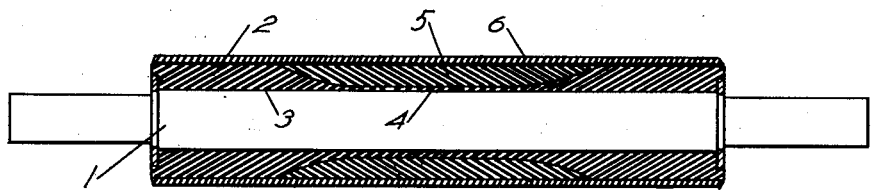
Figure 3:
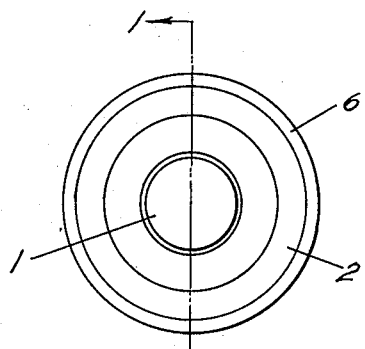

Fig. 1 is a section on the line 1—1 in Fig. 3 of a preferred construction.

Figure 2:
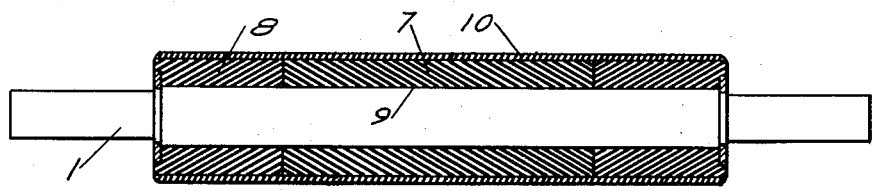

Fig. 2 a similar view showing an alternative construction.

Fig. 3 an enlarged end view of a roll.

1 marks the roll shaft and 2 a portion of the roll wall. This is secured by bonding at 3 to the shaft. The central portion of the wall 2 has an annular depression 4 and this is filled with a wall of rubber 5 which is preferably of higher grade and more resilient stock than that forming the portion of the wall 2. A rubber covering, or envelope 6 encloses the entire shaft, this envelope being of similar grade of rubber throughout the length of the shaft, and of a quality to present a desirable appearance.

As the wringer is ordinarily used the larger mass of the clothes is passed through the center of the wringer and any clothes that reach toward the ends of the wringer are usually of little thickness and consequently it is desirable that the ends of the rolls be slightly harder than the center in order to properly wring these accidental extensions toward the end. In the present case this works out in harmony with economy of manufacture in that the more resilient rubber such as is used in the part 5 carries less compound and consequently is a more expensive grade of rubber so that the wall as a whole can be made not only better but cheaper.

In the alternative construction shown in Fig. 2 the shaft 1 has a central wall 9 formed upon it and end walls 8, the end walls 8 being of a different quality preferably harder than the central portion 7. In this case the resilient central portion 7 goes down to the bonding rubber 9 at the shaft. An envelope 10 is provided over the entire length of the wall as in the preferred construction.

What I claim as new is:—

1. A wringer roll comprising a shaft; an integral rubber wall secured to the shaft, said wall having a resilient working and expressing portion, said portion having a different quality of rubber at the center than at the ends; and a one-quality envelopes over the entire length of roll.

2. A wringer roll comprising a shaft; an integral rubber wall secured to the shaft, said wall having a resilient working and expressing portion, said portion having a more resilient rubber at the center than at the ends; and a one-quality envelope over the entire length of roll.

3. A wringer roll comprising a shaft; and an integral rubber wall of resilient rubber forming the working and expessing portion of the wall, said wall having one quality of rubber secured to the shaft and extending therefrom to form an annular depression at the center and a different quality of rubber filling the depression.

In testimony whereof I have hereunto set my hand.

HORACE W. THOMPSON.